United States Patent [19]

Nolan

[11] Patent Number: 4,896,261
[45] Date of Patent: Jan. 23, 1990

[54] SYSTEM FOR SCHEDULING SERIAL MESSAGE TRANSMISSION ON A BUS WHICH IS ADOPTABLE FOR RESCHEDULING PRIORITIZED MESSAGES USING A DOUBLY-LINKED LIST

[75] Inventor: Michael P. Nolan, Elk Grove, Ill.

[73] Assignee: Motorola Inc., Schaumburg, Ill.

[21] Appl. No.: 934,057

[22] Filed: Nov. 24, 1986

[51] Int. Cl.⁴ .................. G06F 13/42; G06F 11/14
[52] U.S. Cl. .................................. 364/200; 340/825.5;
371/32; 364/240.1; 364/260.1; 364/262;
364/265.1; 364/266.5
[58] Field of Search ... 364/200 MS File, 900 MS File;
340/825.5; 370/85; 371/32, 33

[56] References Cited

U.S. PATENT DOCUMENTS

| | | | |
|---|---|---|---|
| Re. 31,319 | 7/1983 | Fraser | 370/80 |
| 4,058,672 | 11/1977 | Crager et al. | 358/257 |
| 4,456,956 | 6/1984 | El-Gohary et al. | 364/200 |
| 4,493,021 | 1/1985 | Agrawal et al. | 364/200 |
| 4,539,677 | 9/1985 | Lo | 370/85 |
| 4,570,220 | 2/1986 | Tetrick et al. | 364/200 |
| 4,663,706 | 5/1987 | Allen et al. | 364/200 |
| 4,700,185 | 10/1987 | Balph et al. | 340/825.06 |
| 4,715,031 | 12/1987 | Crawford et al. | 340/825.5 |
| 4,720,784 | 1/1988 | Radhakrishnan et al. | 364/200 |
| 4,814,979 | 3/1989 | Neches | 364/200 |

OTHER PUBLICATIONS

Kenneth Sherman, *Data Communications: A User's Guide*, 1981, Reston Publishing Company, Inc., pp. 172-174, 134-135, 132-133.

Jean-Paul Tremblay et al., *An Introduction to Data Structures with Applications*, 1984, McGraw-Hill, Inc., pp. 284-291.

William D. Skees, *Computer Software for Data Communications*, 1981, Lifetime Learning Publications, pp. 80-82.

J1708 Draft for Serial Data Communications between Microcomputer Systems in Heavy Duty Vehicle Applications, Jan. 1986.

*Primary Examiner*—David Y. Eng
*Assistant Examiner*—Florin Munteanu-R
*Attorney, Agent, or Firm*—Phillip H. Melamed

[57] ABSTRACT

A system (10) for scheduling serial message transmission on a single bus (11) having a plurality of messages to be sent stored in memory (21) with each message located between associated start and end message addresses (START, END). A message list or queue (28) of the messages to be sent is formed and stored in memory (22) wherein the list comprises message pointer blocks (27) associated with each of the messages. Each pointer block includes at least the message start and end addresses, the message unique ID code (MID), the message priority (PRI), the address of the message pointer block associated with the next message to be sent (NEXT) and the address of the message pointer block associated with the previous message to be sent (PREV). A message transmission apparatus (16, 17, 18, 19) then sequentially serially transmits the messages on the bus in accordance with the message transmission order specified in the message list. New messages are scheduled for transmission by appropriately linking a new message pointer block to the lift, and previously sent messages are rescheduled for retransmission by delinking the previous message pointer block and relinking it further down the list. The system eliminates the need for storing sent messages in buffer memory in the event a message is improperly sent and must be resent, and no movement of actual messages in memory is required to alter the message transmission sequence since this is accomplished by just appropriately relinking message pointer blocks in the list.

15 Claims, 6 Drawing Sheets

SYSTEM FOR SCHEDULING SERIAL MESSAGE TRANSMISSION ON A BUS WHICH IS ADOPTABLE FOR RESCHEDULING PRIORITIZED MESSAGES USING A DOUBLY-LINKED LIST

BACKGROUND OF THE INVENTION

The present invention relates to scheduling serial message transmissions on a bus. More specifically, the present invention is related to such systems which utilize a single bus and wherein rescheduling of the message transmission order must be efficiently implemented.

In some message transmission systems, it is required that messages be retained after transmission in case a faulty transmission/reception of the message occurred. In the event of such a fault, then the message must be scheduled for retransmission. Also, generally message transmission systems require scheduling in accordance with message priority, and, therefore, reception of a new message of a higher priority requires the efficient rescheduling of all messages which remain to be sent so as to transmit the messages of higher priority first. Such systems can correspond to the American Truck Association (ATA) system J1708 which is a system recommended for serial data communications between microcomputer systems in heavy duty vehicle applications.

In systems such as those discussed above, typically it is undesirable to have to physically move any message stored in memory in the event that a new message has been received which requires transmission prior to the previously-stored message. In other words, any systems which require moving actual stored messages in order to implement reprioritization of messages waiting to be sent is an undesirable system since this would require extensive time to implement such message movement in memory. In addition, typically systems require the feature of saving messages which have been sent in case faults are subsequently detected which will require the retransmission of this message. Systems which implement this by utilizing buffer memory to store each message after it is sent are undesirable because of the consumption of additional time required for such message storage and the requirement for additional memory space. In addition, the function of locating the message to be retransmitted in the event of a fault is generally time-consuming in prior systems since all messages which were previously sent are searched in a generally inefficient manner.

SUMMARY OF THE PRESENT INVENTION

An object of the present invention is to provide a system and method for scheduling serial message transmission on a bus which overcomes the above-mentioned deficiencies of prior systems.

In one embodiment of the present invention, a system for scheduling serial message transmission on a bus is provided. The system comprises: means for storing in a memory a plurality of messages to be sent, each message being stored in sequential address locations in said memory between an associated message start address and an associated message end address; means for storing in a memory a list (queue) of said messages, said list comprising a plurality of message pointer blocks each associated with one of said messages, each pointer block including at least the following information, the message start address of the message associated with the pointer block, the address of the pointer block associated with the next message scheduled to be sent, and the address of the pointer block associated with the previous message to be sent; message transmission means for sequentially serially transmitting said messages on a bus in accordance with the next message transmission order specified in said list; and means for adding a new message to be transmitted by said transmission means by adding an associated new message block to said list and altering at least one of said pointer blocks previously on said message list to refer to the address of said new block, said new block including at least the following information, the message start address of the new message associated with the new block, the address of the pointer block associated with the next message scheduled to be sent, and the address of the pointer block associated with the previous message to be sent. A method corresponding to the operation of the above-noted system is also provided.

Essentially, the scheduling of serial message transmission implemented by the present invention involves the use of a doubly-linked message list to control the order of message transmission. An effective transmit next pointer is utilized to direct the message transmission means to each next message to be transmitted, and this direction takes place through utilization of the information in each message pointer block in the list. Typically, the message pointer blocks also include prioritization associated with the message associated with the block, as well as a count of the number of times of attempted transmission. The actual messages typically include a message check sum byte at the end address of the message and a unique message identification byte (MID) at the beginning address of the stored message. The system generally includes means for responding to a detected transmission/reception failure of one of the messages by rescheduling that message for retransmission. This rescheduling utilizes the message list and the previous message linking in the list to identify the message block associated with the failed message. This message block is then delinked from the message list and relinked into the list at a subsequent location in order to implement retransmission of the message.

By manipulation of message lists, instead of actual messages, the present invention minimizes foreground time required for actual message transmission since messages are merely transmitted in accordance with the order specified in the message list. In addition, no extensive movement of actual messages between various memory locations is required in order to implement rescheduling of message transmission order or to locate previously-sent messages which may have to be rescheduled for retransmission. This is because these functions are implemented through manipulation of message pointer blocks which are added and/or rescheduled by changing linkages between message pointer blocks in the message list.

BRIEF DESCRIPTION OF THE DRAWINGS

For a more complete understanding of the present invention, reference should be made to the drawings in which.

DESCRIPTION OF THE PREFERRED EMBODIMENTS OF THE INVENTION

Figure 1:
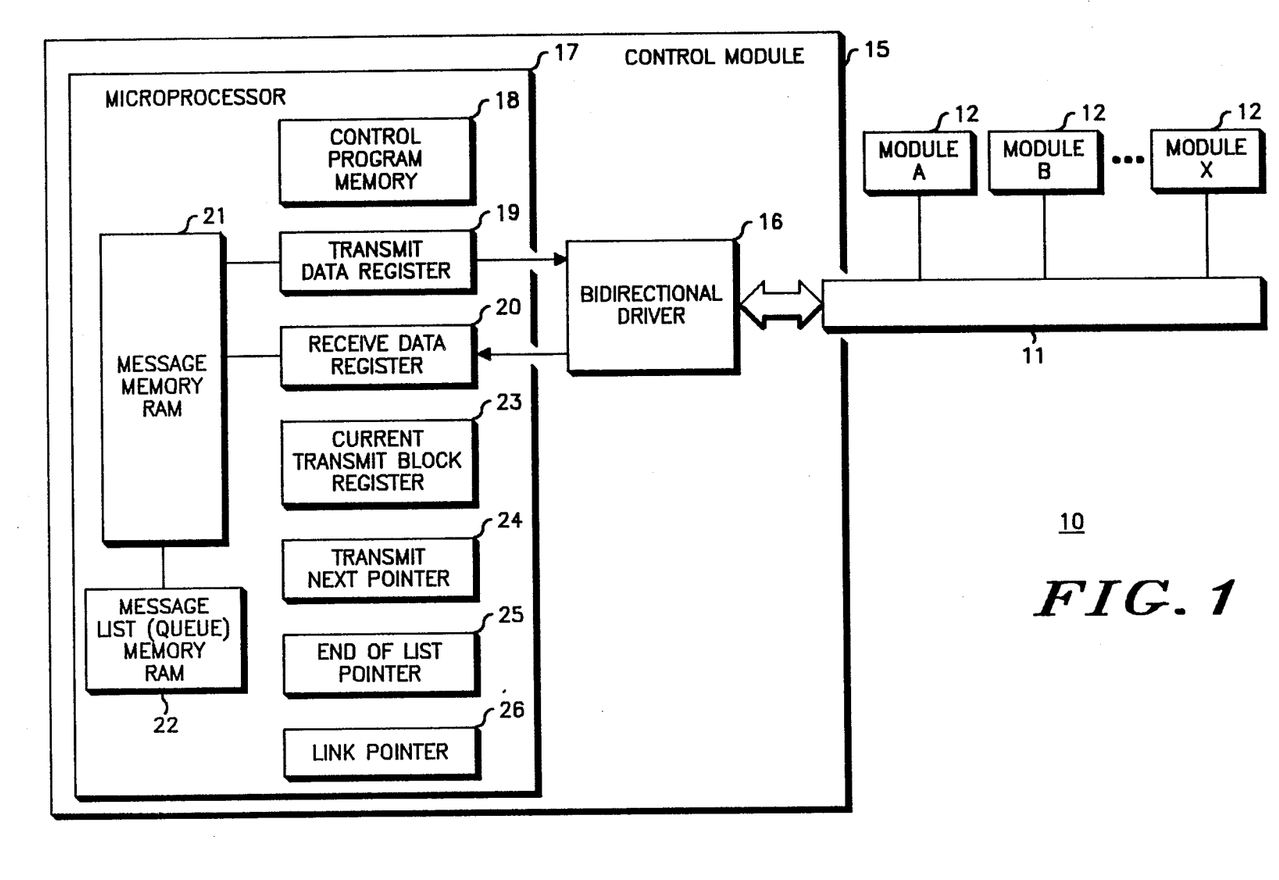
FIG. 1 comprises a schematic block diagram of a system for scheduling serial message transmission on a bus which system is constructed in accordance with the present invention.

Referring to FIG. 1, a schematic diagram of a system 10 for scheduling serial message transmission on a single bus 11 is illustrated. Preferably, the bus 11 comprises a twisted pair signal bus, but any signal bus, including an RF link, is contemplated by the present invention. Connected to the bus are a plurality of utilization modules/devices A through X which are identified by the reference numeral 12 in FIG. 1. These modules utilize information transmitted to them via the bus 11 and also can transmit messages to a control module 15 attached to the bus 11. The control module 15 essentially transmits and/or receives messages from the utilization modules 12, thereby allowing the modules to communicate not only with the control module 15 but also with each other. This bidirectional method of operation of the control module 15 is indicated in FIG. 1 by the presence of a bidirectional driver 16 within the control module 15.

Essentially, the control module 15 controls the operation of the utilization modules 12, as well as responding to signals from these modules to implement various control functions in either the control module 15 itself or in other modules attached to the bus 11, or other devices connected to outputs of the control module 15. The control module 15 may also implement control functions in response to sensor inputs directly connected to the module 15, rather than being connected via the bus 11. The system as discussed above is conventional and is utilized when any of a number of utilization devices are connected to a common bus line and are controlled by a single control module providing instructions to the bus. As noted previously, the general communication system contemplated by the present invention is that disclosed in the ATA J1708 serial data communication system which requires the control module to be able to sequentially transmit a number of messages on the bus 11 to various utilization modules and requires the retransmission of any messages which are not properly transmitted via the bus 11. The ATA J1708 system also specifies the general format of the messages to be sent on the bus 11.

The bidirectional driver 16 in FIG. 1, which is merely representative of hardware which can serially either receive or transmit data on the bus 11, is bidirectionally connected to a microprocessor 17 in FIG. 1. Preferably, the component 17 includes a Motorola microprocessor, such as the Motorola 68HC11, and memory to store the messages to be transmitted, as well as to store the control program for implementing the present invention. In FIG. 1, various locations within the microprocessor 17 are illustrated wherein these locations comprise various memory locations and/or temporary working memory registers in which various information is stored.

In the microprocessor 17, a control program memory location 18 is illustrated in which the programming of the microprocessor is stored wherein this programming implements the various functions desired of the microprocessor. This desired operation of the microprocessor is further illustrated by the flowcharts illustrated in subsequent FIGS. 3 through 5. Transmit and receive data registers 19 and 20 are also illustrated in FIG. 1 and are representative of temporary memory locations in which data to be transmitted or received is stored. It is contemplated that this data transmission/reception occurs in a bit by bit serial fashion. A message memory RAM (random access memory) 21 is in the microprocessor 17 and will effectively receive the data stored in the receive data register 20 and provide the data to be transmitted to the transmit data register 19. This is done in accordance with the programming of the microprocessor 17 as per the programming steps provided in the control program memory 18.

The present invention, rather than realigning actual messages stored in the memory 21 each time a change in message scheduling occurs, effectively implements such a function through the use of message pointer blocks wherein each message has an associated message pointer block stored in a memory so as to form a list, or queue, of the messages to be sent on the bus 11 by the control module 15. In FIG. 1, these message pointer blocks are designated as being stored in a separate message list (Queue) memory RAM 22. However, of course, the memory 22 can be just a different section of the larger message memory 21.

FIG. 1 also illustrates that the present invention contemplates the use of a current transmit block register 23, wherein this register will store message pointer block information associated with the current message that is to be transmitted by the control module 15. In addition, the microprocessor 17 also includes a transmit next pointer 24, an end of list pointer 25 and a link pointer 26, wherein each of these comprises a register which is utilized to store various information required by the control program in the memory 18 so as to implement desired functions of the control module 15. In order to obtain a better understanding of the present invention, reference is now made to FIG. 2 which illustrates the relationship between the message pointer blocks in the memory 22, the actual messages in the message memory 21, the transmit next pointer 24 and the end of list pointer 25.

Figure 2:
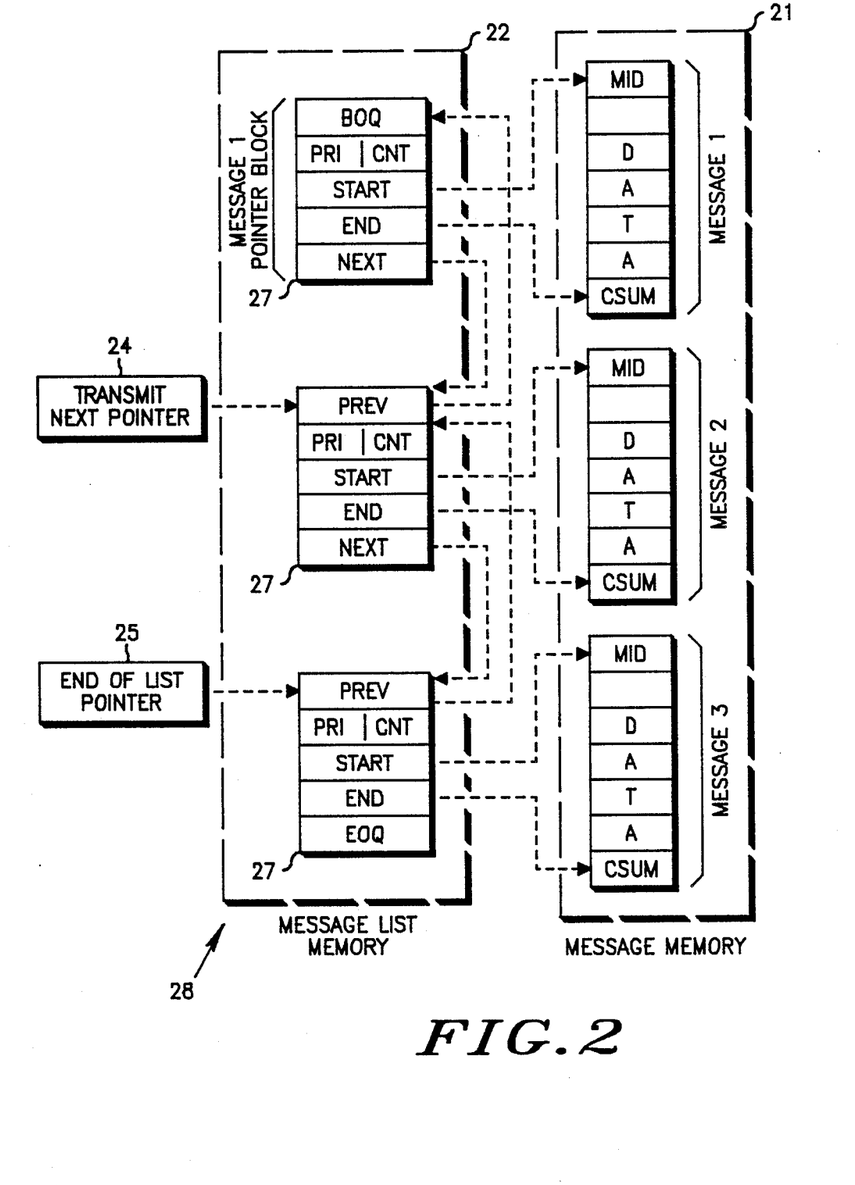
FIG. 2 comprises a graphic representation of messages to be sent by the system in FIG. 1, the message pointer blocks associated with these messages which form a message list, and additional pointers utilized for implementation of the present invention.

Referring now to FIG. 2, the message memory 21 is illustrated as containing three different messages 1 through 3 wherein, of course, many other additional messages can be stored in this memory. Each message is stored in the memory 21 in sequential address locations in the memory between an associated message start address and an associated message end address. As illustrated in FIG. 2, at the message start address, each message has a unique message identification byte (MID) which is associated with this message and distinguishes this message from other messages. In sequential address locations after the MID, data comprising the message is stored, and this is followed by a check sum byte which is located in the end message address associated with the message. The relative positions of messages 1, 2, and 3 in message memory 21 is not significant, since the transmission order of these messages will be determined by message pointer blocks in the message list memory 22.

In some prior systems, scheduling transmission of these messages would be accomplished by merely insuring that each of the messages were stacked sequentially adjacent each other in a memory, and then a transmitter would just sequentially transmit each bit of message in memory in the order they were stacked. However, such a system is not readily implementable if the order of message transmission must be altered since the messages might be of different length and since altering actual message location in memory could involve substantial time. Therefore, the present invention proposes controlling the transmission of messages in accordance with a transmission order specified in a message list stored in the memory 22.

FIG. 2 illustrates that for each message to be sent an associated message pointer block 27 is provided. Each pointer block 27 includes the associated message start address (START), the associated message end (END) address, the address of the pointer block associated with the next message scheduled to be sent (NEXT) and the address of the pointer block associated with the previous message to be sent (PREV). In addition, each pointer block 27 associated with a message includes a priority byte (PRI) associated with that message and a count byte (CNT) associated with the number of times that transmission of that message had been attempted. The present invention involves controlling message transmission through the use of a message list 28 shown in FIG. 2 as comprising the message pointer blocks 27. The present invention involves scheduling of messages by altering the previous and next message pointer block addresses in various pointer blocks in the message list. The message list 28 specifies the order in which messages are to be transmitted by the microprocessor 17.

Before commencing with a discussion of the operation of the present invention in manipulating the message list 28 stored in the memory 22, it should be noted that for the message list 28 illustrated in FIG. 2, the message pointer block 27 at the beginning of the list 28 has a previous message pointer block address set at a value BOQ. BOQ stands for beginning of queue wherein this address value is outside of the realm of possible address locations for message pointer blocks. This is so as to identify the first pointer block as the beginning of the message list 28. In addition, the message pointer block associated with message 3 has a next message pointer block address set at EOQ representative of end of queue. Again, the EOQ location is outside of the possible memory location addresses for message pointer blocks so as to identify the message 3 pointer block as the last block in the message list. In FIG. 2, the relationship between the data in each of the message pointer blocks, the messages associated with these pointer blocks and the addresses of adjacent pointer blocks in the list 28 is illustrated in dashed form.

Normally, the data in the transmit next pointer 24 in FIG. 2 will point to the beginning address of the message pointer block 27 associated with the next message to be transmitted. Thus, when the transmit next pointer is illustrated as being directed to the pointer block associated with message 2, as shown in FIG. 2, this contemplates that message 1 has previously been transmitted or, at least, that the data in the message pointer block for message 1 has been loaded into the current transmit block register 23 such that transmission of message 1 will now occur regardless of any subsequent rescheduling of messages commencing with the message associated with the transmit next pointer 24 or subsequent thereto. FIG. 2 also illustrates that the end of list pointer 25 points to the message pointer block associated with message 3. The end of list pointer 25 is contemplated as always pointing to the message block which is at the end of the message list 28 in memory 22. The operation of the present invention in utilizing the message list 28 in memory 22 to implement scheduling and rescheduling of messages will now be discussed in accordance with the flowcharts shown in FIGS. 3 through 5. These flowcharts are representative of the programming of the microprocessor 17 so as to implement the functions of the present invention and the operation of devices external to the microprocessor. The flowcharts comprise process/decision blocks corresponding to steps which implement the present invention.

Figure 3:
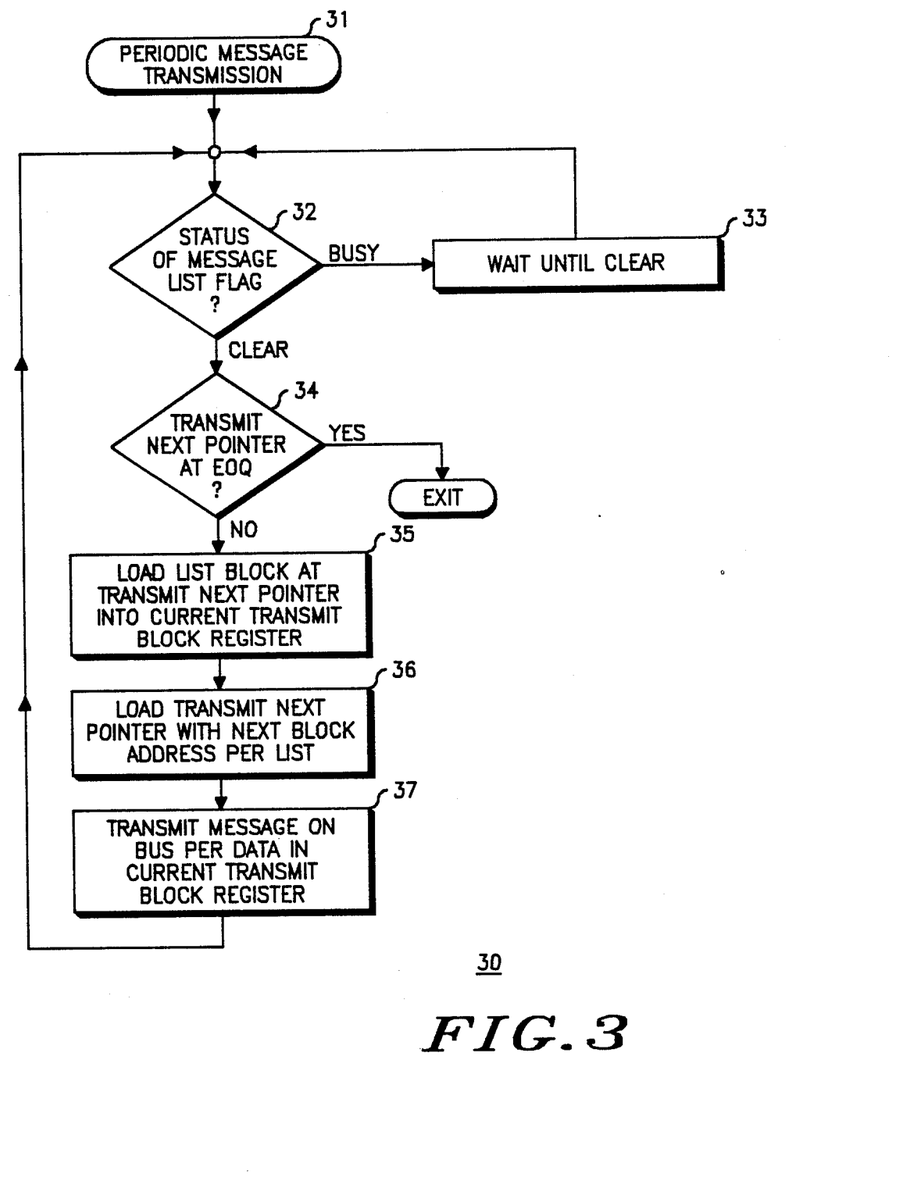
FIGS. 3, 4A, 4B and 5 comprise various flowcharts which illustrate the operation of the system shown in FIG. 1.

FIG. 3 illustrates a flowchart 30 representative of functions implemented by the present system which result in message transmission on the bus 11. The flowchart is periodically entered at an entry state 31 which indicates that message transmission of messages contained on the message list 28 is now desired. Control passes from the entry point 31 to a decision block 32 which inquires as to the status of a message list flag. This flag is either set at a busy level if manipulations are in process which can affect the order of the message blocks 27 in the message list 28, or it is set at a clear level if no such manipulations are currently in process. If the message list flag is busy, control passes to a wait block 33 and remains there until the message list flag is cleared. In other words, accessing information from the message list 28 in memory 22 is not permitted by the flowchart 30 if operations are currently under way which may result in altering the sequence of message transmissions specified by the message list.

If the decision block 32 indicates that the message list flag is clear, control passes to a decision block 34 which inquires if the transmit next pointer is set at EOQ (end of queue). If so, this indicates that all previous messages in the message list 28 have been transmitted, and, therefore, the message transmission flowchart 30 is exited. If the transmit next pointer is not set at EOQ, this indicates that at least one message block remains on the message list 28 wherein this block is associated with a message that has not yet been transmitted. This results in transferring control to a process block 35. The process block 35 results in loading the message pointer block 27 located at the address location in the transmit next pointer 24 into the current transmit block register 23. Control then passes to a process block 36 which loads the transmit next pointer with the next message pointer block address specified in the pointer block 27 which was just loaded into the current transmit block register 23. For example, if, prior to process blocks 35 and 36, the transmit next pointer pointed to the address of the message pointer block 27 associated with message 2, as shown in FIG. 2, process blocks 35 and 36 would cause the message 2 pointer block to be loaded into the current transmit block register 23 and the transmit next pointer would now be loaded with the address of the message pointer block 27 associated with message 3.

After implementation of the process block 36, control passes to a process block 37 which proceeds to transmit a message, on the bus 11, per the message data which is contained in the current transmit block register 23. After this is accomplished, control passes again to the decision block 32. Essentially, the process block 37 results in the microprocessor 17 loading message data into the transmit data register 19 wherein the message to be loaded is identified by the message pointer block data in the register 23. Transmission of data corresponding to this message then continues, independently of any changes to the message list 28, until the entire message, including the trailing check sum byte, has been transmitted on the bus 11.

It can be seen that the flowchart 30 results in scheduling transmission of messages in accordance with the order specified in the message list 28 stored in memory 22. When a message is to be transmitted, the message data in the memory 21 is copied into the transmit data register 19 while the actual message remains in the message memory 21 in the event that this message may have to be retransmitted in case of a failure of transmission/reception of the message. Clearly the message transmission flowchart 30 does not require any complex decision to be made by the microprocessor 17 during the critical and time-consuming step of message transmission since any scheduling of the messages has occurred previously and has been implemented just by altering the linkage of message blocks 27 in the message list 28. This is illustrated in more detail in the flowcharts in FIGS. 4A, 4B and 5 which are directed to the adding of new messages to be sent and the resending of previous messages. It is, of course, understood that execution of the flowchart 30 will continue, assuming that no busy message list flag is encountered, until all messages on the list which are awaiting transmission have been transmitted.

Figure 4A:
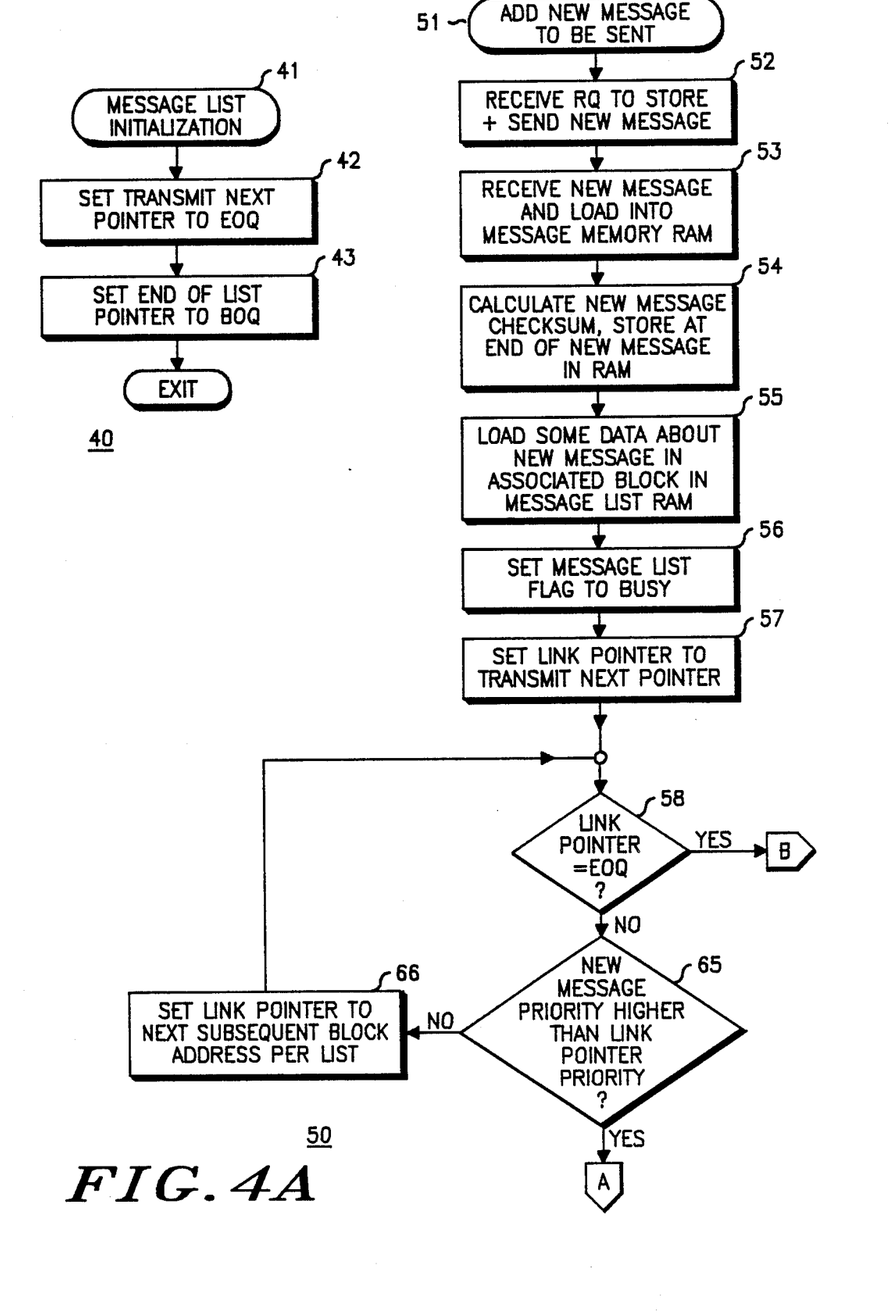

Referring to FIG. 4A, an initialization flowchart 40 is illustrated wherein this flowchart is just executed once prior to the construction of a new message list 28 wherein previously there were no message pointer blocks 27 in the message list. Such a situation would occur if, pursuant to some message list cleanup routine, the entire message list had been deleted since an extremely long period of time had elapsed since all messages contained on the message list had been transmitted. The present invention preferably contemplates such a clean-up function, even though this function is not specifically illustrated in the Figures. The flowchart 40 is an initialization program entered at step 41 and essentially involves setting the transmit next pointer to the address EOQ (process block 42) and setting the end of list pointer to the address BOQ (process block 43). The significance of these initial settings of the transmit and end of list pointers is apparent when the remaining flowcharts in FIGS. 4A and 4B and the flowchart in FIG. 5 are analyzed.

Figure 4B:
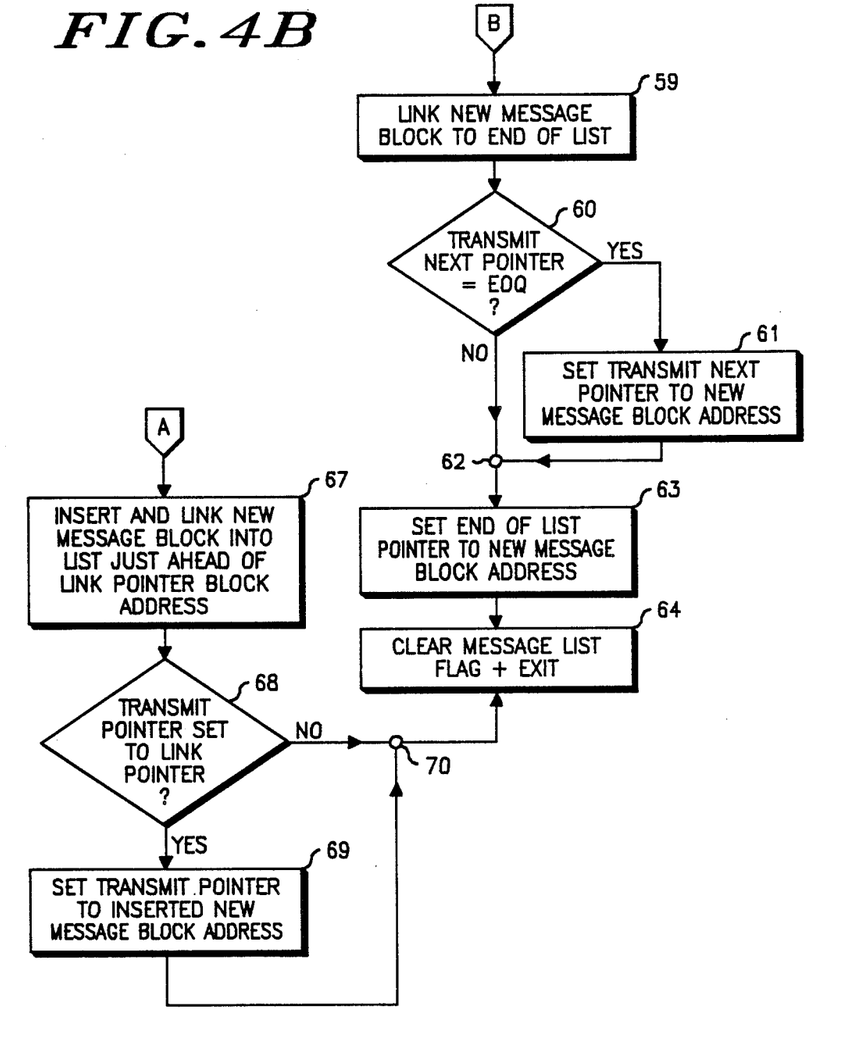
Figure 5:
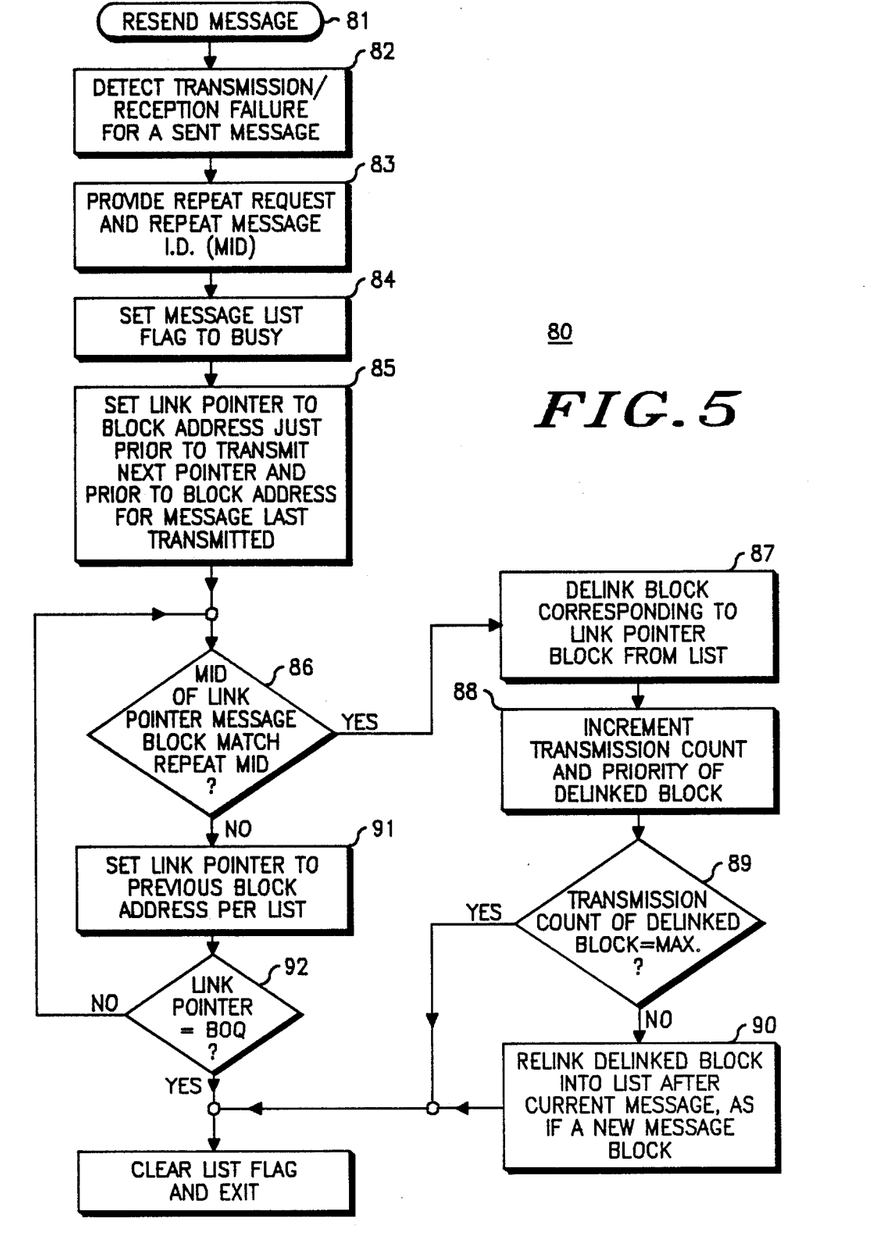

FIGS. 4A and 4B illustrate a flowchart 50 which essentially implements adding new messages to be sent by the microprocessor 17 on the bus 11. Entry to the flowchart 50 is through an entry step 51. Essentially the microprocessor 17 receives a request that some message will be sent to it for storage and subsequent sending on the bus 11 (process block 52). Subsequently this message is received and loaded into the message memory 21 in sequential memory locations (process block 53). This message can arrive from any of the utilization modules 12 attached to the bus 11, or it can be received by some separate hardware providing an additional input to the control module 15, or it can be an error message internally generated by the microprocessor 17. In any event, the above concept, which is implemented by process blocks 52 and 53, is just that the microprocessor 17 will receive some message and load it sequentially into memory locations in the message memory RAM 21. As noted previously, these messages comprise an initial message identification code (MID), followed by data. In the present system, the microprocessor 17 then calculates the check sum byte for this newly-received message and stores it in a memory location directly adjacent to the end of the data associated with this new message. While this is the preferred method of operation in the present invention, of course, the new message itself could have its own check sum byte at the end of it, and this would eliminate the step represented by process block 54. In either case, the check sum byte is provided at the end message address.

After process block 54, it is now time for the microprocessor 17 to begin construction of a message pointer block 27 associated with this new received message. This is commenced by process block 55 wherein this corresponds to loading, in sequential address locations in the message list RAM 22, data about this newly-received message in an associated new message pointer block 27. The data which is loaded by the process block 55 comprises a blank address representative of a previous pointer block address, the priority associated with the newly-received message, a count indicative of how many prior transmissions of this message have been attempted, the start address of the new message stored in the message memory 21, the end address of the new message stored in the message memory 21, wherein this end address corresponds to the check sum byte address, and a blank address representative of the next message pointer block address. Therefore, process block 55 essentially characterizes the newly-received message by constructing an associated new message pointer block and reserves blank spots for insertion of message pointer block addresses which will be necessary to link this new message pointer block into the existing message list 28.

After process block 55, the message list flag is set to busy since now the microprocessor 17 will perform linking operations to properly add the new message pointer block to the message list in the memory 22. During this time, it is desired that the flowchart 30 not access additional messages through the use of the transmit next pointer since subsequent operations in the flowchart 50 may affect which message should be the next message to be transmitted. After the message flag is set to busy, the link pointer 26 in FIG. 1 is set to the transmit next pointer address value per process block 57 wherein this link pointer is essentially a working pointer used to assist in linking the new message into the message list 28.

After the link pointer is set to the transmit next pointer per process block 57, control passes to a decision block 58 which decides if the link pointer is set to the end of queue address EOQ. If this is the case, then the decision block 58 recognizes that the end of the message list 28 in memory 22 has been reached. This occurs when the sending of the new message is not any more urgent than the sending of any of the messages on the list which remain to be sent. In such a case, the new message is to be added to the end of the existing message list 28 in the memory 22, and this procedure is commenced by a process block 59 which links this new message block to the end of the message list. This occurs by inserting the end of queue address EOQ in the next message pointer block address of the new message pointer block and setting the previous address in the new message pointer block to the address of the message block which was previously at the end of the message list. This corresponds to setting the previous address of the new message pointer block to the address in the end of list pointer. Also, the next message pointer block address of the pointer block previously at the end of the list is set to the address of the new message pointer block.

After the process block 59, control passes to a decision block 60 which inquires if the transmit next pointer is currently set to EOQ. If so, this indicates that there were no previous messages in the message list 28 that were scheduled for subsequent transmission, and, therefore, a process block 61 is reached which sets the transmit next pointer to the address of the new message block. If the transmit next pointer was not set at EOQ, then control passes from decision block 60 to a summing terminal 62. After the process block 61, control also passes to the terminal 62. From the terminal 62, control passes to process block 63 which now sets the end of list pointer to the address of the new message block since this message block is now at the end of the list. Subsequently, control passes to a process block 64 which clears the message list flag and exits the flowchart 50.

The steps represented by the flowchart path comprising blocks 59 through 63 are the ones involved if the decision block 58 determines that the new message is to be inserted at the end of the existing message list 28 because the link pointer was set to EOQ. If the link pointer does not have a value of EOQ, the decision block 58 results in transferring control to a decision block 65 which effectively compares the priority of the new message, as stated in the new message pointer block, with the priority of the message identified by the message block contained at the address designated in the link pointer. If the new message does not have a priority higher than the message associated with the message block addressed by the link pointer, then control passes to a process block 66 which essentially sets the link pointer to the next subsequent block address per the message list 28, and control returns to the decision block 58. Thus, the flowchart 50 blocks 65 and 66 result in an effective comparison of the priority of the new message with the priorities of all of the messages awaiting transmission. Unless the new message has a higher priority than any of the messages awaiting transmission, it will be inserted at the end of the message list 28 per blocks 59–63.

If decision block 65 determines that the new message has a priority associated with it which is higher than the priority of a message awaiting transmission, then control passes from decision block 65 to a process block 67. Process block 67 essentially involves inserting and linking the new message pointer block into the message list 28 just ahead of the pointer block addressed by the link pointer. This is accomplished by setting the previous address of the new message pointer block to the previous address contained in the pointer block referred to by the link pointer, setting the next address of the new message pointer block to the address in the link pointer, setting the previous pointer block address in the message pointer block referred to by the link pointer to the address of the new message pointer block and setting the next address of the pointer block which preceded the block addressed by the link pointer to the new message pointer block address. All of this merely involves linking the new message pointer block in the proper position in the message list 28 by setting the previous and next block addresses of the new message pointer to the appropriate values, as well as altering other previous and/or next addresses in other pre-existing pointer blocks to accomplish the proper linking.

After process block 67, control passes to a decision block 68 which inquires if the transmit pointer is set to the link pointer. If this is the case, then the next message which was to have been sent was the message that the new message has just been inserted prior to. Therefore, a process block 69 will now set the transmit pointer to the newly-inserted block address. If the decision block 68 determines that the transmit pointer was not set to the link pointer, then control passes to a summing terminal 70. After process block 69 control also passes to this same terminal. From the terminal 70, control passes to the process block 64 which now clears the message list flag and exits the flowchart 50.

As can be seen from the above-described operation of the flowchart 50, the present invention contemplates scheduling new messages to be sent merely by altering the linkings in the message list 28 and creating a new message pointer block 27. Thus, no actual movement of messages in memory is required in order to reschedule the transmission order of messages. This is advantageously implemented by the present invention through the use of the doubly-linked (previous and next linked) message list 28 of the present invention.

FIG. 5 illustrates a flowchart 80 which is implemented when it is desired to resend a message which has previously been sent. Typically, this occurs when an error in the transmission/reception of the message has been detected after the message has been transmitted on the bus 11. In such a case, essentially the flowchart 80 will search for the message pointer block associated with this message, delete it from the messages which precede the transmit next pointer block, and relink this message block subsequent to the transmit next pointer block as if the message to be resent now comprises a new message. However, because of the resending of this message, the priority of the message to be resent will be raised and the count of message attempts in the message pointer block associated with this message will be incremented. Thus for resending messages, these messages now acquire a higher priority, and if a large number of attempts in sending this message is implemented, clearly there is a problem in the message and no further attempts should be implemented. This latter feature of preventing further message transmissions after some maximum count is associated with the message block identifying this message is illustrated in flowchart 80.

Flowchart 80 is entered at an initial entry stage 81 when resending of a message may be desired. In order to determine if the message is to be resent, essentially a detection of a transmission/reception failure of a previously-sent message occurs, and this corresponds to a process block 82. In response to such a detection, the microprocessor 17 is provided with a repeat request and a message ID identifying the message to be repeated. This is implemented by a process block 83. It is not significant if the microprocessor 17 itself implements the steps 82 and 83, or if these steps are implemented by the utilization modules 12 which receive the messages and then determine if there has been a failure. In either event, the essential feature is that something signals the microprocessor 17 to resend a specific message identified by its unique message ID code (MID). In response to such an occurrence, process block 84 sets the message list flag to busy so as to prevent further access to the message list 28 by the transmission flowchart 30.

Subsequently, the link pointer is now set to the pointer block address prior to the transmit next pointer address and prior to the block address for the message last transmitted. This is implemented by a process block 85. Essentially, in response to a resend request, the flowchart 80 will start searching backwards in the message list 28 wherein the starting point from this search will at least be the transmit next pointer address identifying the message pointer block of the next message to be sent. Of course, if the previous message has not finished being sent by the transmit data register 19, then there is no reason to search the current message being sent since the check sum byte for that message has not yet been transmitted, and, therefore, clearly that is not the message which generated a repeat message request. In that case, it is the message prior to the message currently being sent which will form the beginning of the back-searching implemented by flowchart 80.

After process block 85, control passes to a decision block 86 which effectively compares the message ID (MID) of the message associated with the pointer block address in the link pointer to the MID corresponding to the repeat message MID. If a match is obtained, then the message pointer block corresponding to the message to be resent has been found. If so, control passes to a process block 87 which essentially will delink this message pointer block, corresponding to the link pointer block, from the message list 28. Then a process block 88 will increment the transmission count in this pointer block and reprioritize this pointer block. Then control passes to a decision block 89 which asks if the number of attempted prior transmissions, corresponding to the transmission count (CNT), is equal to some maximum number. If so, then there is a problem with the message and no further transmissions should be attempted. If the maximum transmission count has not been achieved, control passes from block 89 to a process block 90. Block 90 relinks the identified message block after the current message block in the current transmit register 23 as if this identified message block was now a new message. These delinking and relinking steps implemented by blocks 87 and 90 substantially correspond to the techniques discussed in detail with respect to the flowchart 50, and merely involve removing a message pointer block from the message list 28, fixing the linkages between the remaining blocks so as to obtain continuity, and inserting the removed block subsequent to the message block associated with the message currently being sent. After the relinking implemented by the block 90 has occurred, the message list flag is cleared and the flowchart 80 is exited.

If the decision block 86 determines that the message ID of the message block addressed by the link pointer does not match the repeat MID, then a process block 91 will set the link pointer to the preceding previous block address per the message list 28, and a decision block 92 will inquire if the link pointer is now equal to the BOQ address indicating that the top of the message list 28 has been reached. If the top of the list has not been reached, then control passes again to the decision block 86, and inquiries are again made as to if the repeat request MID matches the MID associated with the message block now addressed by the link pointer. Once the top of the list has been reached, and no match of message ID has occurred, then the decision block 92 rightfully concludes that it cannot resend the requested message since that message was not previously sent by the microprocessor 17. This is because the repeat MID does not correspond to a MID associated with a message pointer block prior to the current message being sent. In that case, the flowchart 80 will clear the message list flag, and the flowchart 80 will be exited.

Flowchart 80 illustrates that the double linking of the message list 28 in memory 22 is extremely valuable in searching for messages which may have to be resent.

The search strategy implemented by the flowchart 80 commences with the message immediately preceding the message last sent, and then all prior messages are searched in order with the most recently-sent messages being searched first and the least recently-sent messages being searched last. This is a preferred technique of searching for messages to be resent, since it corresponds to the most likely situation to occur. By searching in this reverse order, as specified by flowchart 80, substantial operation time of the microprocessor 17 is saved in that all messages in the message list do not have to be searched and very old messages, which presumably would have generated fault detections a long time ago, are not searched prior to the most recently-sent messages which are the most likely to have generated a fault resulting in the message resend request.

Clearly the present invention has implemented an advantageous scheduling of serial message transmissions on a bus. This has been accomplished through the use of a doubly-linked message pointer list wherein the order of transmission is determined by the linking of message pointer blocks which form the message list. This same technique is applicable to the sequential execution of computer program steps wherein the execution of such steps corresponds to the "transmission of messages" as described herein. Thus the transmission of messages is defined herein as being equivalent to the execution of program steps. While specific embodiments of the present invention have been shown and described, further modifications and improvements will occur to those skilled in the art. All such modifications which retain the basic underlying principles disclosed and claimed herein are within the scope of this invention.

I claim:

1. System for scheduling serial message transmission on a single bus, comprising:

means for storing in a memory a plurality of messages to be sent, each message being stored in sequential address locations in said memory between a corresponding message start address and a corresponding message end address;

means for storing in a memory a list (queue) of said messages, said list comprising a plurality of message pointer blocks each corresponding to, and thereby identifying, one of said messages, each pointer block including at least the following information, the message start address of the message corresponding to the pointer block, the address of the pointer block corresponding to the next message scheduled to be sent, and the address of the pointer block corresponding to the previous message to be sent;

message transmission means, coupled to said message storing means and said message list storing means, for sequentially serially transmitting said messages on a bus in accordance with the next message transmission order specified in said list; and means, coupled to said message list storing means, for adding a new message to be transmitted by said transmission means by adding a corresponding new message block, which identifies the new message, to said list and altering two of said pointer blocks previously on said message list to refer to the address of said new block, said new block including at least the following information, the message start address of the new message corresponding to the new block, the address of the pointer block corresponding to the next message scheduled to be sent and the address of the pointer block corresponding to the previous message to be sent, said system including means for rescheduling, in response to reception of a repeat request, a previously-sent message for retransmission, wherein rescheduling occurs by utilization of said message list to identify the message pointer block corresponding to the message to be resent, and effectively adding said identified message pointer block to said list as a new block corresponding to a message to be sent, wherein said rescheduling means includes means for, after identifying the message pointer block in said list corresponding to the message to be resent, increasing priority date corresponding to said identified pointer block, such increased priority data being compared to priority data corresponding other pointer blocks on said list when adding said identified block to said list as a new block of a message to be sent to determine where on said list said new block should effectively be added.

2. System for rescheduling serial message transmission on a single bus, comprising:

means for storing in a memory a plurality of messages to be sent, each message being stored in sequential address locations in said memory between a corresponding message start address and a corresponding message end address;

means for storing in a memory a list (queue) of said messages, said list comprising a plurality of message pointer blocks each corresponding to, and thereby identifying, one of said messages, each pointer block including at least the following information, the message start address of the message corresponding to the pointer block, the address of the pointer block corresponding to the next message scheduled to be sent, and the address of the pointer block corresponding to the previous message to be sent;

message transmission means, coupled to said message storing means and said message list storing means, for sequentially serially transmitting said messages on a bus in accordance with the next message transmission order specified in said list; and means, coupled to said message list storing means, for adding a new message to be transmitted by said transmission means by adding a corresponding new message block, which identifies the new message, to said list and altering two of said pointer blocks previously on said message list to refer to the address of said new block, said new block including at least the following information, the message start address of the new message corresponding to the new block, the address of the pointer block corresponding to the next message scheduled to be sent, and the address of the pointer block corresponding to the previous message to be sent, wherein each of said message pointer blocks includes the message end address of the message corresponding to the pointer block, wherein each message includes a check sum byte therein associated with the message, and wherein said check sum byte is located at the message end address corresponding to the message.

3. System for scheduling serial message transmission according to claim 2 wherein each message includes therein a unique message identification byte (MID) associated with the message.

4. System for scheduling serial message transmission according to claim 3 wherein said MID is located at the message start address of the message.

5. System for scheduling serial message transmission on a single bus, comprising:

means for storing in memory a plurality of messages to be sent, each message being stored in sequential address locations in said memory between a corresponding message start address and a corresponding message end address;

means for storing in a memory a list (queue) of said messages, said list comprising a plurality of memory pointer blocks each corresponding to, and thereby identifying, one of said message pointer blocks including at least the following information, the message start address of the message corresponding to the pointer block, the address of the pointer block corresponding to the next message scheduled to be sent, and the address of the pointer block corresponding to the previous message to be sent;

message transmission means, coupled to said message storing means and said message list storing means, for sequentially serially transmitting said messages on a bus in accordance with the next message transmission order specified in said list; and means, coupled to said message list storing means, for adding a new message to be transmitted by said transmission means by adding a corresponding new message block, which identifies the new message, to said list and altering two of said pointer blocks previously on said message list to refer to the address of said new block, said new block including at least the following information, the message start address of the new message corresponding to the new block, the address of the pointer block corresponding to the next message scheduled to be sent, and the address of the pointer block corresponding to the previous message to be sent, said system including means for rescheduling, in response to reception of a repeat request, a previously-sent message for retransmission, wherein rescheduling occurs by utilization of said message list to identify the message point block corresponding to the message to be resent, and effectively adding said identified message pointer block to said list as a new block corresponding to a message to be sent, said system also includes a transmit pointer means for effectively keeping track of which pointer block in said message list corresponds to the next scheduled message to be sent.

6. System for scheduling serial message transmission according to claim 5 wherein said rescheduling means includes means for effectively searching said message list backwards from the message pointer block referred to by said transmit pointer means for the message pointer block corresponding to the message to be resent.

7. System for scheduling serial message transmission according to claim 6 wherein said means for adding said identified message pointer block to said message list as a new block includes means for adding said identified block to said list at a position no earlier than the message block which precedes the message block referred to by said transmit pointer means.

8. System for scheduling serial message transmission according to claim 7 wherein said rescheduling means includes means for removing said identified message pointer block from said message list from a position prior to the message pointer block referred to by said transmit pointer means.

9. Method for scheduling serial message transmission on a single bus, comprising the steps of:

storing in a memory a plurality of messages to be sent, each message being stored in sequential address locations in said memory between a corresponding message start address and a corresponding message end address;

storing in a memory a list (queue) of said messages, said list comprising a plurality of message pointer blocks each corresponding to one of said messages, each pointer block including at least the following information, the message start address of the message corresponding to the pointer block, the address of the pointer block corresponding to the next message scheduled to be sent, and the address of the pointer block corresponding to the previous message to be sent;

sequentially serially transmitting said messages on a bus in accordance with the next message transmission order specified in said list; and adding a new message to be transmitted by adding a corresponding new message block, which identifies the new message, to said list and altering at least one of said pointer blocks previously on said message list to refer to the address of said new block, said new block including at least the following information, the message start address of the new message corresponding to the new block, the address of the pointer block corresponding to the next message scheduled to be sent, and the address of the pointer block corresponding to the previous message to be sent, said method includes the step of rescheduling, in response to reception of a repeat request, a previously-sent message for retransmission, wherein rescheduling occurs by utilization of said message list to identify the message pointer block corresponding to the message to be resent, and effectively adding said identified message pointer block to said list as a new block corresponding to a message to be sent, wherein said rescheduling step includes the step of, after identifying the message pointer block in said list corresponding to the message to be resent, increasing priority data corresponding said identified pointer block, such increased priority data being compared to priority data corresponding to other pointer blocks on said list when adding said identified block to said list as a new block of a message to be sent to determine where on said list said new block should effectively be added.

10. Method for scheduling serial message transmission on a single bus, comprising the steps of:

storing in a memory a plurality of messages to be sent, each message being stored in sequential address locations in said memory between a corresponding message start address and a corresponding message end address;

storing in a memory a list (queue) of said messages, said list comprising a plurality of message pointer blocks each corresponding to, and thereby identifying, one of said messages, each pointer block including at least the following information, the message start address of the message corresponding to the point block, the address of the pointer block corresponding to the next message scheduled to be sent, and the address of the point block corresponding to the previous message to be sent;

sequentially serially transmitting said messages on a bus in accordance with the next message transmission order specified in said list; and adding a new message to be transmitted by adding an associated new message block, which identifies the new message, to said list and altering at least one of said pointer blocks previously on said message list to refer to the address of said new block, said new block including at least the following information, the message start address of the new message corresponding to the new block, the address of the pointer block corresponding to the next message scheduled to be sent, and the address of the pointer block corresponding to the previous message to be sent, wherein each of said message pointer blocks includes the message end address of the message corresponding to the pointer block, and wherein each message includes a check sum byte therein associated with the message and wherein said check sum byte is located at the message end address corresponding to the message.

11. Method for scheduling serial message transmission according to claim 10 wherein each message includes therein a unique message identification byte (MID) associated with the message and wherein said MID is located at the message start address of the message.

12. Method for scheduling serial message transmission on a single bus, comprising the steps of:

storing in a memory a plurality of messages to be sent, each message being stored in sequential address locations in said memory between a corresponding message start address and a corresponding message end address;

storing in a memory a list (queue) of said messages, said list comprising a plurality of message pointer blocks each corresponding to, and thereby identifying, one of said mesages, each pointer block including at least the following information, the message start address of the message corresponding to the pointer block, the address of the pointer block corresponding to the next message scheduled to be sent, and the address of the pointer block corresponding to the previous message to be sent;

sequentially serially transmitting said messages on a bus in accordance with the next message transmission order specified in said list; and adding a new message to be transmitted by adding an associated new message block, which identifies the new message, to said list and altering at least one of said pointer blocks previously on said message list to refer to the address of said new block, said new block including at least the following information, the message start address of the new message corresponding to the new block, the address of the pointer block corresponding to the next message scheduled to be sent, and the address of the pointer block associated with the previous message to be sent, said method includes the step of rescheduling, in response to reception of a repeat request, a previously-sent message for retransmission, wherein rescheduling occurs by utilization of said message list to identify the message pointer block associated with the message to be resent, and effectively adding said identified message pointer block to said list as a new block associated with a message to be sent, said method also includes the step of effectively keeping track of which pointer block in said message list corresponds to the next message scheduled to be sent.

13. Method for scheduling serial message transmission according to claim 12 wherein said rescheduling step includes the step of effectively searching said message list backwards, from no later than the message pointer block corresponding to the next message scheduled to be sent, for the message pointer block corresponding to the message to be resent.

14. Method for scheduling serial message transmission according to claim 13 wherein said step of adding said identified message pointer block to said message list as a new block comprises adding said identified block to said list at a position no earlier than the message block which precedes the message block corresponding to the next message scheduled to be sent.

15. Method for scheduling serial message transmission according to claim 14 wherein said rescheduling step includes the step of removing said identified message pointer block from said message list from a position prior to the message pointer block corresponding to the next message scheduled to be sent.

* * * * *